Patented Dec. 19, 1950

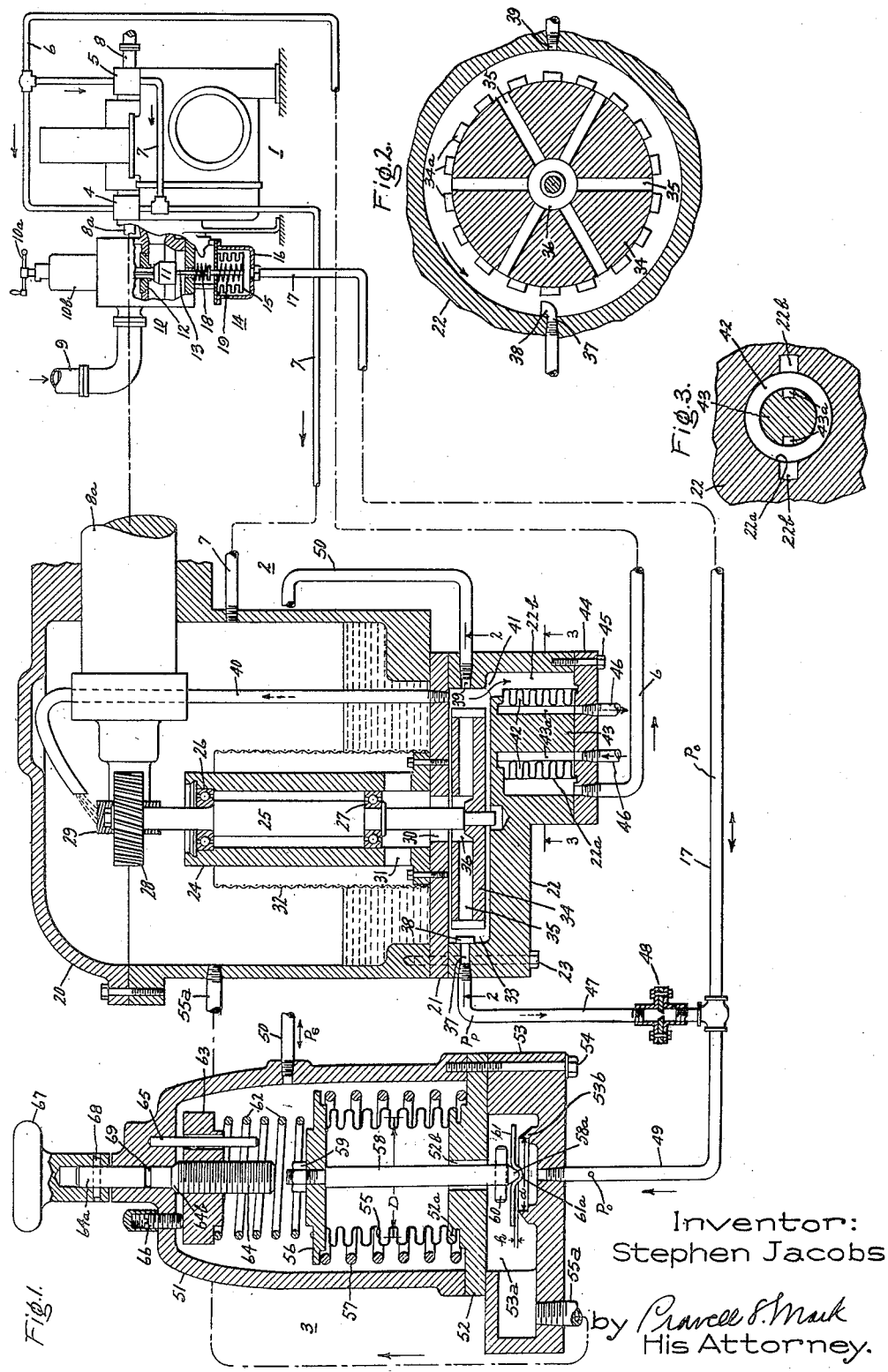

2,534,974

UNITED STATES PATENT OFFICE 2,534,974

PRESSURE CHANGE AMPLIFIER FOR HYDRAULIC GOVERNING SYSTEMS

Stephen Jacobs, Fitchburg, Mass., assignor to General Electric Company, a corporation of New York Application April 23, 1948, Serial No. 22,785

2 Claims. (Cl. 137—153)

This invention relates to automatic hydraulic operating mechanism for regulating a constant speed machine having a member for adjusting the speed thereof. It relates particularly to a hydraulic governing system for the throttling valve of a fluid pressure prime mover such as a steam turbine, and it is this adaptation of the invention which is particularly described herein. However, it will be appreciated that the invention may be applied wherever a machine has a regulating member which must be continuously adjusted so as to maintain the speed of the machine at a pre-selected value.

This hydraulic governing system is of the general type in which a suitable pressure generating device produces a signal pressure which increases as a known function of increasing speed, this signal pressure being suitably modified so as to be capable of properly operating a hydraulic motor arranged to position the regulating member of the machine being controlled. In hydraulic turbine governing systems of this general type, it is desired that (1) the movement of the turbine governing valve in the closing direction should approach as nearly as possible a straight-line function of the increase in the speed signal pressure. (2) So that the turbine governing valve may be promptly and properly positioned, regardless of any tendency of the valve to stick due to differential thermal expansion between the parts of the valve or due to dirt getting into the valve structure, the pressure change in the hydraulic actuating motor should be as large as possible for a given change in the speed signal pressure. (3) In order that the hydraulic valve positioning motor may have the best possible operating life, it is desirable that the absolute pressure at which this motor operates be as small as possible.

Accordingly, an object of this invention is to provide an improved hydraulic speed governing system of the type described which is simple in arrangement yet effectively achieves the desirable features listed above.

A further object is to provide a simple yet very reliable hydraulic turbine governing system which may advantageously be adapted to comparatively small, inexpensive, mechanical drive steam turbines, as used in connection with ventilating blowers, refrigeration compressors, boiler feed pumps, and other miscellaneous industrial applications. Heretofore, it has not been thought feasible to employ hydraulic governing systems of this type in connection with these small inexpensive turbines because of the complexity and cost of the governing systems known to the prior art.

Another object is to provide a hydraulic system for a machine of the type described in which a single simple pressure generating device serves three functions: (1) produces a signal pressure proportional to a speed condition in the machine, (2) supplies operating liquid for actuating a hydraulic motor which adjusts the speed of the machine, (3) supplies lubricating oil under pressure for the bearings and gears of the machine.

A still further object is to provide an improved pressure change amplifier for a hydraulic regulating system of the type described.

Other objects and advantages will be apparent from the following description taken in connection with the accompanying drawings, in which Fig. 1 is a schematic layout, with the principal components in section, showing the entire governing system; Fig. 2 is a section of the speed signal pressure generator taken on the plane 2—2 in Fig. 1; and Fig. 3 is a section on the plane 3—3 in Fig. 1 illustrating details of the construction of a particularly advantageous type of oil cooler which may be used in connection with the invention.

Referring now to Fig. 1 this improved hydraulic system comprises generally a machine to be controlled, such as a steam turbine shown at 1, a fluid pressure generator indicated at 2, and a hydraulic amplifying device shown at 3 and arranged to amplify changes in the speed signal pressure.

The machine shown at 1 is a small mechanical drive turbine, for instance in the power range from 20 to 500 H. P., having a rotor supported in bearings 4, 5 which may be supplied with lubricating oil through a branched conduit 6. Spent lubricating oil may be drained through a conduit 7. The rotor is arranged to deliver its power output through a shaft 8, having an opposite end portion 8a arranged to drive a pressure generating device as described hereinafter. Motive fluid, such as steam at a suitable pressure and temperature, is supplied to the turbine 1 through an inlet conduit 9 by way of a throttling or governing valve indicated generally at 10. While any suitable governing valve may be employed, a particularly advantageous form is that disclosed in application, Serial No. 17,924, filed March 30, 1948, now Patent Number 2,471,160, in the names of William Matson and Stephen Jacobs, and assigned to the same assignee as the present application. The mechanical details of this governing valve are not material to an understanding of the present invention, but it may be noted that the valve includes a steam flow regulating member in the form of a cup-shaped piston 11 cooperatively associated with a valve seat member 12 and positioned by an actuating spindle 13 by a hydraulic motor indicated generally at 14. This motor may include a flexible bellows 15 contained within a housing 16 and defining therewith a pressure liquid chamber to which is supplied operating liquid through a conduit 17. It should also be noted that the hydraulic motor and valve actuating spindle have associated therewith biasing means in the form of springs 18, 19 which tend to urge the flow control member 11 downwardly to its wide open position. The operating liquid supplied through conduit 17 moves the valve 11 towards closed position, against the bias of springs 18, 19.

The end portion 8a of the turbine rotor shaft projects into a housing indicated generally at 20, which encloses gears for driving the pressure generator. Housing 20 may also serve as a reservoir for the oil used to operate the hydraulic governing system and lubricate the bearings. The bottom of housing 20 is formed by a plate 21 which also forms one wall of a pump casing, the other walls of which are defined by a housing 22. Members 21 and 22 are secured to the main portion of the housing 20 by means of a plurality of threaded fastenings 23, in a manner which will be obvious from Fig. 1.

Supported within housing 20, as for instance by being bolted or otherwise secured to the plate 21, is a cylindrical member 24 rotatably supporting a shaft 25 in suitable bearings 26, 27. The upper end of shaft 25 carries a spiral gear 28 meshing with a cooperating driving gear 29 on the extreme end of shaft portion 8a. The lower end of shaft 25 projects through and defines a generously proportioned annular passage with a central opening 30 in the base plate 21. Around the bottom of cylinder 24 are provided one or more generously proportioned ports 31 through which oil which collects in the bottom of housing 20 may pass through the opening 30 to the pump impeller described below. Surrounding and radially spaced from the cylinder 24 is a suitable cylindrical strainer member 32 for filtering the oil passing to the passages 31, 30.

The pump casing 22 and bottom plate 21 define a circular recess 33 in which is located a pump impeller, which may be of a very elementary centrifugal type consisting of a solid disk 34 having drilled therein a plurality of radially extending holes 35. As will be apparent from Fig. 1, the impeller 34 is secured on the end of shaft 25. As may be seen in Fig. 2, the impeller is provided with a row of circumferentially spaced radially extending projections 34a, the purpose of which is to insure that there will be a high tangential velocity component in the annular space between the impeller and the housing. As will also be apparent from Figs. 1 and 2, the impeller disk has a central recess 36 forming a common inlet chamber for the radial passages 35 and communicating directly with the inlet opening 30 in the bottom plate 21. It is to be noted that the inlet passages 31, 30 and the passages through the pump impeller 34 are generously proportioned and designed so that the impeller is of a "high capacity" type, so that over the comparatively small range of rates of flow at which the pump operates, there is substantially no change in discharge pressure as a function of change in rate of flow. In other words, the impeller has a substantially flat characteristic curve and operates over only a small portion of its curve. Because of the comparatively small rate of flow required from this pump, it may more correctly be designated a "pressure generator." It will of course be appreciated that other types of liquid pressure generating devices having similar operating characteristics could be substituted. It should also be noted that the annular space surrounding the circumference of the pump impeller 34 is of constant radial width and contains no diffuser of any type.

The pump casing 22 is provided with four outlets for oil under pressure, as may be seen in Figs. 1 and 2. A first discharge port 37 is provided with a shroud or "scoop" 38 projecting into the annular space surrounding the impeller and having an opening facing against the direction of rotation of the impeller, so that substantially the full total pressure of the whirling fluid in the annulus surrounding the impeller is delivered to the port 37. A second fluid discharge port 39 has no scoop and therefore receives only the static pressure generated by the impeller. Since the design of the impeller insures a high whirl velocity in the discharge annulus, and since there is no diffusing means for converting this whirl velocity into static pressure, the static pressure received at the port 39 will be substantially less than the total pressure communicated to the port 37. For instance, at normal rated speed, the maximum static pressure at port 39 may be of the order of 17 lb./in.$^2$, while the maximum total pressure communicated to port 37 is of the order of 25 lb./in.$^2$.

A third opening in plate 21 communicates with the annular pump discharge passage and a pipe 40 which furnishes a jet of lubricating oil to the meshing teeth of gears 28, 29. The rapid rotation of the gears causes this oil to be thrown radially outward onto the inner walls of the housing 20, whence it runs down and collects at the bottom of the housing to flow again through the strainer 32 and passages 31, 30 to the pump impeller. Lubricating oil for other parts of the machine being governed, specifically the rotor bearings, is supplied through a fourth port 41 to a simple oil cooler formed integral with the housing 22. The arrangement of this oil cooler may be seen by reference to Figs. 1 and 3. It will be apparent that the housing 22 defines a cylindrical recess 22a with diametrically opposed longitudinal grooves 22b. Seated in recess 22a is an ordinary convoluted open-ended bellows member 42. Within bellows 42 is a central cylindrical plug member 43 having diametrically opposed longitudinal grooves 43a. The plug member 43 snugly fits the inner portions of the convolutions of the bellows 42 to form therewith a plurality of half-annular passages in parallel, communicating between the grooves 43a. Likewise, the outer portions of the convolutions of bellows 42 snugly fit the interior surface of the recess 22a to form half-annular passages communicating in parallel between the grooves 22b. The recess 22a is closed, and the bellows 42 and central plug member 43 are retained in position in the recess, by means of a cover plate 44, which may be secured to the housing 22 by a plurality of suitable threaded fastenings 45. The cover plate 44 is provided with three ports, one of which communicates between one groove 22b and supplies cooled lubricating oil through conduit 6 to the bearings 4, 5. The opposite groove 22b communicates with the pressure oil inlet port 41. The other two ports in the cover plate 44 are connected to a pair of conduits 46 communicating with the longitudinal grooves 43a in the central plug 43.

The operation of the oil cooler will now be apparent. Warm oil under pressure passes through the pump discharge port 41 into the cooperating groove 22b, thence through the half-annular passages defined between the exterior surface of the bellows 42 and the inner surface of recess 22a. This oil is collected in the other groove 22b and passes out through head plate 44 to the conduit 6 and to the bearings or other parts of the machine requiring lubrication. Likewise a suitable coolant, for instance water, is circulated through the conduits 46 to the longitudinal grooves 43a and around the parallel half-annular passages formed between the inner surfaces of the bellows 42 and the exterior surface of the central plug 43. With the coolant flow in the direction indicated by the arrows in Fig. 1, the warm oil and the coolant are in "counterflow" relation, for best thermal efficiency of the cooler.

Operating liquid for the hydraulic motor 14 is supplied through the pump discharge port 37 to a conduit 47 communicating with conduit 17. As shown in Fig. 1, the conduit 47 is provided with a flow-restricting pressure-reducing orifice 48. This may be a simple circular orifice of the sharp-edged type, having no means for varying the effective area of the orifice. Communicating with the downstream side of the orifice 48 are other conduits 49 and 17, connected to the pressure change amplifier 3 and motor 14, respectively. The static speed signal pressure from port 39 is communicated to the pressure amplifier 3 by means of conduit 50.

The construction and arrangement of the pressure change amplifier 3 are shown in detail in Fig. 1. It will be seen that the housing of the amplifier comprises a dome member 51 having an open lower end closed by a plate 52 and a lower casing member 53, all of which may be secured together by suitable threaded fastenings 54. The casing of the amplifier defines three separate chambers, to one of which is communicated the static speed signal pressure through the conduit 50, another is in communication with the pressure at the downstream side of the flow restriction 48 by way of conduit 49, while the last is a drain chamber communicating with a drain conduit 55a, as more particularly described hereinafter.

Within the dome 51 of the pressure amplifier is a flexible bellows 55 which may be secured at its lower end to the bottom plate 52, as for instance by spinning over and brazing to an annular projection 52a on the base plate 52. The upper end of bellows 55 may be closed, or may be brazed to a movable disk member 56. The outer circumference of disk 56 provides a movable abutment for a comparatively heavy biasing coil spring 57, the lower end of which seats on the base plate 52. Secured to the central portion of disk 56 is a spindle 58, which may be held by means of a nut 59 or equivalent fastening device. The opposite end of spindle 58 passes freely through an opening 52b in the center of base plate 52 into the drain chamber 53a defined by the lower casing member 53. At its extreme end, the spindle 58 is provided with a conical rounded end portion 58a and a transverse pin 60 which serves to limit upward movement of spindle 58 by engagement with the lower surface of plate 52.

The bottom wall of casing 53 defines a bleed port formed by an annular projection 53b the upper edge of which is preferably shaped to form a sharp annular edge of diameter $d$. The circular chamber defined within the projection 53b communicates with the conduit 49 as will be apparent from Fig. 1.

Cooperatively associated with the sharp annular edge of projection 53b is a floating or self-aligning valve disk member 61 having a central portion defining a rather deep, smoothly curved "dimple" at 61a adapted to receive the rounded conical point 58a of the spindle 58. The lower surface of disk 61 cooperates with the sharp edge of the annular projection 53b to form an annular liquid bleed orifice through which oil passes from the conduit 49 into the drain chamber 53a. It will be appreciated that the depth of the dimpled portion 61a is so related to the maximum upward travel of spindle 58, as limited by stop pin 60, that the valve disk 61 may not accidentally fall out of its proper position relative to the annular portion 53b.

It will now be apparent that the speed signal pressure is communicated to a first chamber within dome 51 and outside the bellows 55. A second intermediate chamber comprises the space within bellows 55 communicating through the generous clearance space 52b with the drain chamber 53a. The third chamber is that defined within the annular projection 53b, closed at one side by the movable valve disk 61, and communicating with the conduit 49.

For modifying the upward biasing force of spring 57 on the movable disk 56, an adjustably loaded spring arrangement is provided. This comprises a coil spring 62 having one end bearing against the upper surface of the movable disk 56, while its other end engages an adjustable abutment 63 in the form of a disk having a threaded bore engaging a rotatable threaded member 64. A dowel pin 65 secured in the end of dome 51 projects through a hole in movable abutment 63 so as to prevent rotation of the member 63 while permitting it to travel longitudinally as the threaded member 64 rotates. Movement of the abutment upwardly is limited by a manually adjustable screw 66. Formed integral with the threaded member 64 is a spindle 64a having a manual adjusting knob 67 secured to the upper end thereof by means of a transverse dowel pin 68. At the juncture of the threaded member 64 and the spindle 64a is a conical thrust bearing surface 64b which takes the axial force of the spring 62 and has some effect in sealing the leakage path between the spindle 64a and the housing 51. Further insurance against the leakage of liquid to the exterior of the housing 51 may be provided by a sealing device in the form of a resilient ring 69 seated in an annular groove in spindle 64a. This sealing ring 69 may be of circular or oval cross section, and represents a well-known type of liquid seal popularly known as an "O-ring." Obviously other equivalent liquid sealing means could be provided for the spindle 64a. It will be apparent that the effect of the spring 62 and the related mechanism for adjusting the position of the movable abutment 63 is to vary the net effective upward biasing force of the main spring 57, thus permitting ready adjustment of the normal speed which the governing system is set to hold.

The drain conduit 55a returns liquid from chamber 53a to the housing 20. Since the point at which conduit 55a discharges into housing 20 is above the level of the drain chamber 53a, the latter will always be kept full of oil. It will be obvious that the scavenging line 7 from the bearings 4, 5 will readily return spent lubricating oil to the housing 20 by gravity flow.

In general, the operation of the complete system is that the turbine regulating valve piston 11 is positioned by hydraulic motor 14 in a closing direction by means of operating liquid under pressure from the pump, which pressure is ordinarily substantially lower than the speed signal pressure by reason of the pressure drop across the flow restriction 48. For this reason, the flexible bellows 15 in the hydraulic motor 14 will have a comparatively long life, even though the degree of deflection required of it in order to open and close the governing valve 11 is rather large. The function of the amplifier 3 is to regulate the opening of the bleed orifice defined between annular projection 53b and the movable valve disk 61 so that any change in the speed signal pressure is accompanied by a materially magnified change in pressure in the hydraulic motor 14. Thus substantial changes in force for adjusting the hydraulic motor 14 are obtained from comparatively small changes in the speed signal.

For convenience in the following detailed description of the operation of the mechanism, the following symbols (shown in Fig. 1) will be used:

$P_p$, "power pressure" delivered to conduit 47 by means of the total head scoop 38 in the pump housing.

$P_o$, reduced pressure at the downstream side of the flow restriction 48, which is the "operating pressure" supplied to the hydraulic motor 14.

$P_s$, static signal pressure supplied through conduit 50 to the outside of the bellows 55 in the pressure change amplifier 3.

$D$, effective diameter of the speed signal responsive bellows 55.

$d$, effective diameter of the annular bleed port defined between the annular projection 53b and the movable valve disk 61.

$h$, the "lift" of the valve disk 61, which is of course the axial width of the annular bleed orifice formed with the projection 53b.

$a_o$, the area of the restricted orifice formed in the device 48.

The detailed operation of the system is as follows. When the system is inoperative, with the turbine rotor at rest, spring 57 in the amplifier will bias spindle 58 to the upward limit of its travel, with pin 60 engaging plate 52, so that the bleed port is wide open. Assume that the manual adjusting knob 67 has been rotated until the abutment 63 is against the limiting stop 66, corresponding to the maximum speed setting of the governor. Since there is no pressure in the hydraulic motor 14, the biasing spring 18 will hold the turbine throttle valve 11 in its wide open position. If now steam is admitted to the turbine, as for instance by manual actuation of the hand crank 10a which serves to open a shut-off valve (not shown) contained in housing 10b, the rotor shaft 8 will begin to turn and the pump impeller 34 will supply operating liquid through conduit 17 to the hydraulic motor 14, at the same time building up a pressure on the flexible bellows 55 in the amplifier 3. As long as the valve disk 61 remains in its wide open position, the pressure in the hydraulic motor 14 will not be sufficient to move the governing valve 11 towards closed position. However, the signal pressure $P_s$ acts on the bellows 55 to move valve disk 61 downwardly so as to decrease the bleed of liquid through conduit 49. This causes the pressure to build up in the hydraulic motor 14 so as to position the turbine governing valve 11. The interaction of these effects results quickly in reaching an equilibrium position in which both the bleed valve disk 61 and the turbine governing piston 11 are in partly closed positions. Since all the operating liquid which flows through the flow restricting device 48 also flows through the bleed port, it can be shown that, assuming equal flow coefficients for the bleed port and orifice, the following relation obtains when the system is in equilibrium:

$$h = \frac{a_o}{\pi d}\sqrt{\frac{P_p}{P_o} - 1}$$

From the drawing it will be apparent that the effective diameter $D$ of the pressure responsive bellows 55 is substantially greater than the diameter $d$ of the bleed port. The ratio of the corresponding effective areas may for instance be of the order of 2 to 1. It will also be observed from the above description of the structure that the upward biasing force of the main spring 57 plus the upward force on spindle 58 due to the pressure $P_o$ at the bleed port acting on the under surface of valve disk 61 are balanced by the speed signal pressure $P_s$ acting on the bellows 57.

Assume now that a disturbance in the system, for instance sudden removal of load from the turbine output shaft 8, causes the turbine speed to increase above the value for which the governing system is set. The resulting increase in the signal pressure $P_s$ causes the valve disk 61 to descend somewhat so as to decrease the effective opening of the bleed port. This causes the operating pressure $P_o$ to increase, whereupon the hydraulic motor 14 moves the governing valve piston 11 slightly towards the closed position. The reduced flow of steam to the turbine of course causes a decrease in speed until a new equilibrium condition is reached. The increase of pressure $P_o$ acting on disk 61 produces a counteracting force tending to increase the lift $h$, thus preventing excessive increase of pressure $P_o$ and reducing the tendency to "overshoot."

Likewise a decrease in the turbine speed results in a decrease in the speed pressure signal $P_s$ so that the spindle 58 rises somewhat to open the bleed port, reduce the operating pressure $P_o$, and cause spring 18 in the hydraulic motor 14 to move the governing valve piston 11 toward open position. Here the decrease in pressure $P_o$ acting on disk 61 again gives a stabilizing effect.

If now it is desired to cause the turbine to operate at a lower speed setting, the manual knob 67 is rotated to lower the abutment 63 and cause the spring 62 to exert a downward biasing force on the movable disk 56. The result is that the net effective upward biasing force on the member 56 is reduced, which means that a smaller speed signal pressure $P_s$ is required to bring the system to equilibrium. Accordingly the governor will cause the turbine to operate at a lower normal speed.

The effect of the pressure change amplifier 3 will now be apparent. Since the pressure responsive bellows 55 has a substantially larger diameter than the bleed port $d$, it will require a greater change in the value of the operating pressure $P_o$ to balance a given change in the speed signal pressure $P_s$. That is, if the effective area of the bellows 55 is twice that of the valve disk 61, it will require a change in pressure of two pounds per square inch in the operating pressure $P_o$ to balance a change in pressure of one pound per square inch in the signal pressure $P_s$. Thus, every change in the signal pressure $P_s$ is reflected in a doubled change in the operating liquid pressure $P_o$ in the hydraulic motor. With this arrangement, a comparably small speed signal pressure may be made to produce a very substantial change in the operating liquid pressure supplied to the governing valve positioning motor. This insures that the turbine governing valve will be positively positioned quickly and effectively regardless of any tendency of the valve to stick.

It will be apparent that the maximum speed which the system may be set to hold is determined by the position of the limiting screw 66 in the amplifier dome 51. The lowest speed which the system will hold is determined by the following considerations. Assume that the system is operating with the adjustable abutment 63 in its lowermost position and the lift $h$ of the valve disk 61 at its minimum value. The design of the various related parts is so selected that there will be a certain minimum flow through the bleed port, and this flow through the restriction 48 will produce a certain pressure differential thereacross. If now the turbine speed should rise, the governing system would try to move the turbine control valve 11 toward closed position. Assume however that the valve 11 sticks and the turbine speed rises still further. The resulting increase in the speed signal pressure $P_s$ will force the valve disk 61 to its fully closed position against annulus 53b, thus completely stopping the flow of liquid through the bleed port. With no flow through the flow restricting device 48, the operating pressure $P_o$ will rise until it is exactly equal to the power pressure $P_p$. This increase in pressure in the actuating motor 14 will produce the extra force required to move the governing valve 11 against any tendency of it to stick. Stated another way, the sharp edged orifice in the flow restricting device 48, springs 18, 19, pump 22, and the other components of the system are so proportioned that, at the lowest speed at which the system is intended to operate, there is a certain pre-selected minimum pressure drop across the orifice in 48 corresponding to a certain minimum desired opening of the bleed port. This minimum pressure drop corresponds to the extra margin of pressure desired during low speed operation for operating the hydraulic motor 14 in the event that the governing valve 11 should stick. As indicated above, this extra margin of pressure becomes available to the hydraulic motor 14 when the valve disk 61 goes to its fully closed position.

As has been noted above, the flexible bellows 15 in hydraulic motor 14 is required to deflect to a considerable extent, but has good operating life by reason of the fact that it normally is subjected to a comparatively low operating pressure. On the other hand, the speed responsive bellows 55 is required to deflect only an infinitesimal amount. While it has been exaggerated in the drawings for purposes of clarity, the actual lift $h$ of the valve disk 61 varies during normal operation over a range of from about .002 inch to a maximum of about .006 inch. Because of this extremely small deflection required of bellows 55, fatigue stresses are reduced to a minimum.

The invention has been found to provide an exceptionally effective and reliable hydraulic amplifier for a governing system which is well suited to small mechanical drive turbines where simplicity and low cost are important factors. The invention makes possible the application to such small turbines of a type of governing system heretofore thought practicable only with much larger turbines. Furthermore with the arrangement shown, the "triple-effect" pump impeller 34 not only provides the speed signal and operating liquid for the governing system, but also provides lubricating oil under pressure for the bearings of the machine. Thus "pressure-oiled" bearings may be used without the additional cost and complexity of a separate lubricating pump.

While a preferred embodiment of the invention has been particularly described herein, it will be appreciated that many modifications could be made in, and obvious equivalents substituted for, the various components of this governing system, and it is desired to cover by the appended claims all such changes and modifications as fall within the true spirit and scope of the invention.

What I claim as new and desire to secure by Letters Patent of the United States is:

1. A pressure change amplifying device comprising a housing having first, second, third, and fourth axially aligned chambers, a transverse wall separating the second and third chambers and having a central opening, a pressure responsive bellows member within the housing separating the first and second chambers and having a first end portion secured to the transverse wall surrounding said opening and a closed end member adapted to move axially of the housing in response to changes of pressure in the first chamber, a main coil spring surrounding the bellows with a first end portion engaging the transverse wall and a second end portion adapted to bias the movable end member of the bellows in a direction away from said wall, an auxiliary coil spring arranged in the first chamber coaxial with said main spring and having a first end portion engaging adjustable abutment means and a second end portion engaging the movable bellows end member in opposition to the main spring, means for positioning said movable abutment axially whereby the effective biasing force of the auxiliary spring may be altered, a spindle having a first end portion connected to the movable bellows end member and extending axially through and having a generous annular clearance space with the central opening in the transverse wall, said clearance space providing free communication between the second and third chambers and preventing mechanical friction between spindle and wall, said spindle having a second end portion disposed in said third chamber, a transverse dowel pin adjacent said second end of the spindle and adapted to engage said transverse wall whereby movement of the spindle in one direction under the biasing force of said main spring is limited by engagement of the dowel pin with the transverse wall, the extreme end portion of the spindle having a curved thrust seat, the walls of the housing having a drain port for discharging liquid from the third chamber, the housing also having a port opening into the fourth chamber and surrounded by an annular portion extending axially from the wall of the housing toward said transverse wall and having a narrow circumferential edge, and a valve disk member having a central portion with a curved socket adapted to engage the thrust seat of the movable spindle and a flat circumferential portion of an outer diameter substantially larger than said circumferential edge adapted to cooperate therewith to define an annular bleed port, the effective area of the bellows exposed to the pressure in the first chamber being substantially greater than that of the valve disk member exposed to the opposing pressure communicated to said bleed port, whereby any change in pressure in the first chamber causes the valve disk member to seek a new equilibrium position in which the change in rate of flow from the bleed orifice into the third chamber is accompanied by a multiplied change in pressure of the liquid in the fourth chamber in accordance with the relative effective areas of said bellows and valve disk member.

2. A pressure change amplifying device comprising a housing having first, second, third, and fourth axially aligned chambers, said housing having a circumferential abutment coaxial with the housing and projecting inwardly between said second and third chambers and having a central opening coaxial with said chambers, a pressure responsive bellows disposed within the housing and separating said first and second chambers, said bellows having a first end portion secured to said circumferential abutment surrounding said opening and a closed end member adapted to move axially of the housing in response to changes in the pressure of a fluid supplied to said first chamber, a main coil spring surrounding the bellows with a first end portion engaging said circumferential abutment and a second end portion adapted to bias the movable end member of the bellows in a direction away from said abutment, a spindle having a first end portion connected to the movable bellows end member at the center thereof, said spindle extending axially through and having a generous annular clearance space with the central opening in said circumferential abutment, which clearance space provides free communication between the second and third chambers and prevents mechanical friction between spindle and abutment, said spindle also having a second end portion disposed in said third chamber and carrying second radially extending abutment means adapted to engage said first mentioned circumferential abutment to limit movement of the spindle axially under the biasing force of said main spring, the extreme end portion of the spindle having a curved thrust seat, the walls of the housing having a drain port for discharging fluid freely from the third chamber, the housing also having a port opening into the fourth chamber surrounded by an annular portion extending axially from the wall of the housing toward said first circumferential abutment and having a narrow circumferential edge, and a valve disk member having a central portion defining a curved socket adapted to engage the thrust seat of the movable spindle and a flat circumferential portion of an outer diameter substantially larger than said circumferential edge and adapted to cooperate therewith to define an annular bleed port, the engagement of the main coil spring with said first mentioned circumferential abutment and the movable bellows end member serving to locate the spindle substantially in the center of the opening in said abutment, the clearance space between spindle and abutment being sufficiently large to prevent mechanical rubbing friction under all normal operating conditions, and the depth of the curved socket engaged by the thrust seat of the spindle being greater than the maximum axial travel of said spindle as determined by engagement of said first and second abutments whereby the valve disk is retained in cooperative relation to said annular edge regardless of the space orientation of the amplifier housing.

STEPHEN JACOBS.

REFERENCES CITED

The following references are of record in the file of this patent:

UNITED STATES PATENTS

| Number | Name | Date |
| --- | --- | --- |
| 1,917,698 | Carson | July 11, 1933 |
| 2,127,293 | Gilman | Aug. 16, 1938 |
| 2,247,434 | Bryant | July 1, 1941 |
| 2,256,963 | Schmidt | Sept. 23, 1941 |
| 2,261,462 | Gabalis | Nov. 4, 1941 |
| 2,301,031 | Ferguson | Nov. 3, 1942 |
| 2,309,892 | Gabalis | Feb. 2, 1942 |